April 17, 1962
D. HARKER
3,030,512
MONOCHROMATOR SYSTEM
Filed Nov. 21, 1958
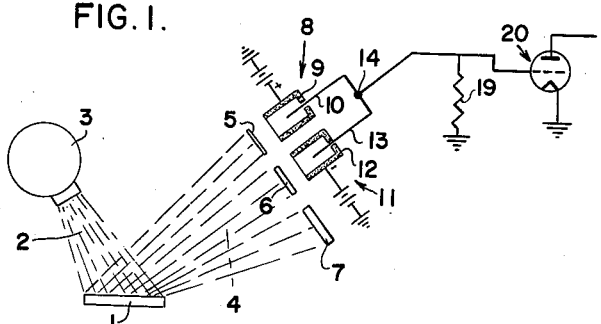
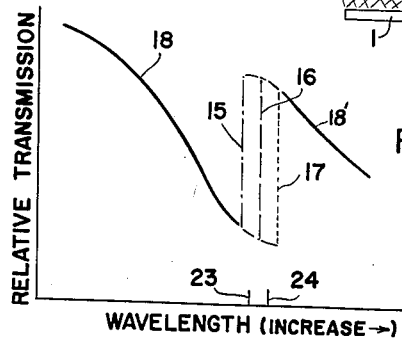
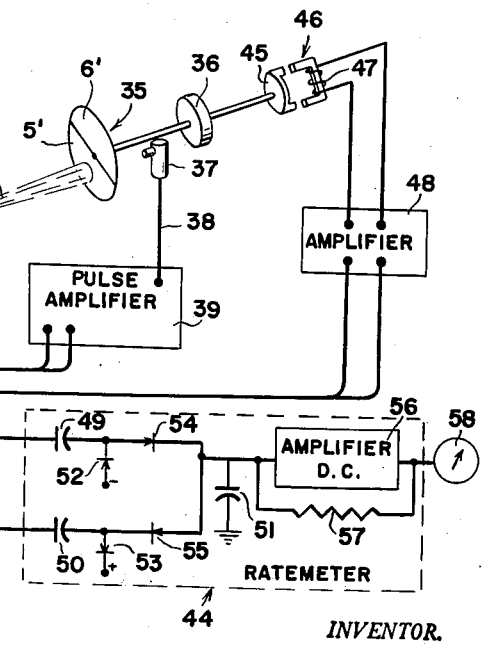
INVENTOR.
DAVID HARKER
BY *Ralph G. Hohenfeldt*
ATTORNEY

United States Patent Office 3,030,512
Patented Apr. 17, 1962

3,030,512
MONOCHROMATOR SYSTEM
David Harker, King's County, N.Y., assignor to General Electric Company, a corporation of New York
Filed Nov. 21, 1958, Ser. No. 775,569
7 Claims. (Cl. 250—83.6)

This invention generally relates to monochromatizing electromagnetic radiation, and in greater particularity, to a method and apparatus for detecting and measuring the intensities of X-rays having wave lengths lying between narrow limits. The invention is particularly, but not exclusively, useful in conducting X-ray diffraction, absorption or emission analyses and the like.

When using prior procedures for detecting radiation having a particular intensity or lying within a narrow range of wave lengths in a heterogeneous beam, it is necessary to use a crystal for spreading the radiation over its spectral band or for focussing radiation of a particular wave length so as to concentrate the same in order that a radiation detector may differentiate or resolve one wave length or intensity level from the others. In other cases, where crystal diffraction is not practical, the presence of a particular wave length or intensity level is directly read by a detector and associated electronic circuits whose resolving power, sensitivity, and stability are extremely critical and difficult to maintain over periods of extended use.

Schemes employing crystals suffer the disadvantage of requiring very accurate and complex, and therefore costly, mechanism for conducting measurements. Furthermore, in measuring weak radiation, the losses in the crystal itself may be so great as to make fast and accurate detection impossible. Direct reading schemes, on the other hand, generally employ electronic pulse height analysers or counters and amplifiers whose characteristics vary over a range exceeding the variations in the radiation they are seeking to measure.

Accordingly, it is an object of the present invention to achieve wave length selection, in a narrow range, without the atendant disadvantages mentioned above.

A further object is to provide a system and apparatus for predetermining and establishing definite wave length limits at each side of the narrow wave length band that is to be selected or identified.

A more specific object is to use balanced filters which transmit radiation substantially equally over a wide wave length band but which have different, predetermined absorption edges or cutoff points that are pronounced and well defined so as to establish with great precision the limits of the radiation wave lengths being detected.

Accomplishment of these and other objects will appear from time to time throughout the course of this specification.

In general terms, the various embodiments of the invention contemplate interception of radiation flux including particular wave lengths to be selected, by at least a pair of filters constituting different materials and so proportioned in thickness that they transmit or absorb equal amounts of radiation over a wide wave length band. Because of the difference in materials, however, each filter has a different absorption edge, or in other words, beyond a certain cutoff point, that is distinctive for each filter, the transmission changes abruptly on respective sides of the wave length band under surveillance. Where emission phenomena are employed, pairs of filters may be successively disposed in the path of radiation so as to facilitate the identification and intensity measurement of various narrow wave length bands. Since the absorption or transmission characteristics change abruptly and by large magnitudes, any reasonably sensitive radiation detector may be employed to read the transmission differences.

In one embodiment of the invention motor means are provided for presenting various pairs of filters to the radiation flux being analyzed and only a single detector is used for each pair combination of filters.

A more detailed description of the invention will now be set forth in conjunction with the following drawing in which:

FIG. 1 is a schematic representation of a system for performing X-ray analysis where a polychromatic primary beam is projected onto a sample that then emits characteristic radiation wave lengths whose identity is determined and intensity measured by a filter and detector arrangement constituting the invention;

FIG. 2 is a curve illustrating the relationship between the X-ray transmission of the various filters and the wave lengths of the radiation being transmitted; and, FIG. 3 schematically illustrates another application of the invention to X-ray diffraction analysis.

Refer now to FIG. 1, in connection with which the general principles of the invention will be described. Here X-ray emission or fluorescent phenomena are employed and there is provided a sample 1 whose constituents are to be determined both qualitatively and quantitatively. A polychromatic X-ray beam 2, emanating from an X-ray tube 3 is projected onto sample 1. If the primary beam contains radiation of sufficiently short wave lengths, the threshold or exciting frequency of the various elements present in the sample will be reached and the sample will emit rays 4 of corresponding characteristic or fluorescent radiation. The polychromatic characteristic radiation 4 is transmitted through at least a pair of adjacent filters 5 and 6 that will be described more fully hereinafter. Another filter 7, in proximity with the filters just mentioned will also have its purpose and construction described later.

There is also provided a pair of detectors in the form of ion chambers 8 and 11 respectively intercepting radiation transmitted through filters 5 and 6. Electrodes 10 and 13 of the ion chambers are connected together at a junction point 14 and their respective shells 9, 12 have applied to them voltages of opposite polarities from the batteries illustrated, or any D.C. source. Thus, it is evident that current signals from each ion chamber 8 and 11 will be directly subtracted at junction point 14 to produce a resultant difference signal dependent upon the intensity differences between radiation passing through the filters 5 and 6. This signal flows through a resistor 19 in order to develop a voltage which may be impressed on the grid of an electrometer tube 20, for example. The electrometer tube circuit and means for further amplifying and utilizing the signal have been omitted because they are well known.

Attention is now invited to FIG. 2 for the purpose of more fully explaining the character of filters 5, 6 and 7. Ordinarily, these filters will be of different thicknesses and of different elements and they will be so coordinated that they will absorb radiation equally effectively over a wide wave length band as indicated by the coincidence of their transmission curves represented by the solid lines 18 and 18' in FIG. 2. For convenience in explaining, it will be assumed that one of the filters 5 is nickel, another filter 6 is cobalt, and the third filter 7 is iron. Additional filters may also be used under some circumstances but they are not shown since their purpose and construction will be clear from an explanation of the quantity illustrated.

The various filters are of such material and thickness that they absorb radiation equally over a wave length range extending to the absorption edge of the nickel filter 5. This edge or cutoff point ordinate is identified by the reference numeral 15 and the dash-dot line in FIG. 2. It is seen that transmission of radiation by the nickel filter 5 increases very abruptly at a wave length corresponding with its absorption edge or at 1.48 angstroms. The cobalt filter 6, whose ordinate is represented by the dashed line 16 undergoes the same abrupt change in transmission at approximately 1.60 angstroms. The iron filter 7 would undergo the same abrupt change at its absorption edge, indicated by the dotted line 17, which is approximately 1.74 angstroms. Since the invention depicted in FIG. 1 depends upon coaction only between one pair of filters at a time, the description will proceed on that basis and consideration will be given mainly to filters 5 and 6.

From the foregoing discussion it will be seen that the signal at 14 due to any radiation including wave lengths on either side of the limits established by a pair of absorption edges, 15 and 16 for example, will be largely cancelled, since the radiation transmitted by the filters 5 and 6 and reaching their associated detectors 8 and 11 is of equal intensity. In other words, the effect produced by a filter and detector combination ordinarily cancels the effect produced by the other similar combination throughout a wave length range on either side of the absorption edge wave lengths of the balanced filters. However, between the absorption edges this cancellation does not occur. In this example, as is clearly evident from the lengths of the ordinates for the nickel absorption edge 15 and the cobalt absorption edge 16, there is a more than 65 percent sudden variation in the transmitted intensity of the wave length that is to be identified as lying between the limits established by the absorption edges of the filters. The large change in the ordinates makes it evident that the detector need not have extreme sensitivity in order to obtain resolution.

To continue with the example, it may be assumed that copper K-alpha radiation is present as indicative of the presence of copper in the sample 1. Copper K-alpha radiation has a wave length of approximately 1.54 angstroms and is indicated on the abscissa scale in FIG. 2 by a line identified with the reference numeral 23. It lies approximately midway in the 0.12 angstrom spread established between the absorption edge limits 15 and 16 of the different thickness nickel and cobalt filters 5 and 6. Hence, it is evident that radiation would be largely undetected up until 1.48 angstroms and beyond 1.60 angstroms, but would produce a strong signal over the narrow wave length band between the absorption edges 15 and 16. The detectors easily sense the pronounced change in transmitted intensity indicating the presence of a wave length corresponding with that of copper K-alpha radiation.

It is readily seen that the foregoing illustrative example may be extended to show that various wave lengths may be identified just as precisely by using additional pairs of balanced filters, such as iron filter 7 in conjunction with cobalt filter 6, whose absorption edges lie adjacent each other as can be seen in FIG. 2 where the iron edge is identified by a dotted line and the reference numeral 17.

For practical work a plurality of filters such as 5, 6, 7 and others may be positioned adjacent each other on a carrier rack that may be moved across the path of the fluorescent rays 4 for detecting various elements present in the sample 1 whose characteristic radiation wave lengths lie within the narrow ranges established by the absorption edges of the several filters. If an iron filter 7 were used in conjunction with a cobalt filter 6 the wave length for nickel K-alpha radiation would lie between the absorption edges 16 and 17 as denoted by the abscissa 24 in FIG. 2.

The invention as thus far described largely involves emission phenomena where the primary X-ray beam 2 in FIG. 1 is polychromatic, including no wave lengths of particular significance, but which merely excites a sample so that it will emit characteristic rays 4 for transmission and identification through the agency of filters 5 and 6. Attention is now invited to FIG. 3 where the general principles of the invention are illustrated in connection with apparatus that is adapted more particularly to analysis by diffraction techniques.

In FIG. 3 the sample 30 is assumed to be a crystalline solid or powder that is positioned for intercepting primary X-radiation 31 emanating from an X-ray tube 32 and diffracting the same. For that purpose it is necessary to be concerned with a particular line of characteristic wave length radiation emanating from X-ray generator 32 as a result of its being operated at a predetermined voltage and with a target whose atomic constitution is such as to cause intense production of the line radiation desired, as well as other radiation. The crystalline sample will then diffract the line radiation according to the distances between the lattice planes of the various crystalline substances present and a diffracted beam 33 will be produced having wave lengths corresponding with several order of diffraction dispersed over a range governed by the well known Bragg equation, $n\lambda = 2d \sin \theta$, where $n$ is the order of diffraction, $\lambda$ the wave length of the radiation, $d$ the distance between lattice planes and $\theta$ the angle of diffraction. In this instance it is usually necessary to limit the diffracted beam by means of a slit 34 and to perform a continuous angular scan with respect to the sample 30 in order to detect the various orders and intensities of the diffracted rays of the desired wave length in the primary beam.

FIG. 3 illustrates in a simplified manner how filters having the characteristics exemplified by the nickel and cobalt curves in FIG. 2 may be employed, for example, in diffraction analyzing. Here the diffracted beam 33 is projected upon a filter assembly, generally designated by the reference numeral 35, that is caused to rotate in the path of the beam. The arrangement is not limited to rotating, for any means for moving alternate filter sections across the beam path is within the scope of the invention. As illustrated, filter assembly 35 constitutes a disc comprising semi-circular filter sections 5' and 6' but it is not limited to only two filter sections since it may include any number of angularly separated filters whose transmission characteristics and absorption edges meet the terms of the exemplary curves in FIG. 2 and the principles explained more fully in connection with the embodiment of the invention represented by FIG. 1. The various filters may be oscillated or, as in this case, rotated by means of a motor 36 whose rotational speed will depend upon other parameters selected, but as an example may be 1500 r.p.m. Immediately behind the rotatable filter assembly 35 there is provided, in this example, a proportional counter 37 that emits electric signal pulses at a rate indicative of the intensity of radiation passing through the filter assembly. It will readily be seen that when the diffracted rays 33 include radiation that is equally absorbed by the pair of filters over a wide range of wave lengths, but which is transmitted unequally over a narrow wave length band lying between the absorption edges of the filters, that the proportional counter will suddenly alter its response in accordance with the abrupt change between the absorption edges. It will be noted that the filters 5', 6' are designed for passing the characteristic line radiation wave length of the generator tube and for rejecting any other radiation. Consequently, the proportional counter tube 37 will see variations in intensity as it is scanned through an angle with the filter assembly 35 over the lattice spacing range established by the sample.

In practice, the X-ray tube 32 remains fixed while sample 30 is rotated. At the same time slit 34, filter assembly 35, motor means 36, and proportional counter 37 are moved jointly by goniometer apparatus, not shown, at twice the angular speed of the sample through an angle whose vertex lies in the region of the sample. The angles of incidence and refraction between beams 31 and 33 and the sample 30 are equal under all circumstances. The distance from the X-ray focal point in tube 32 to the sample 30 is equal to the distance from slit 34 to the sample 30.

As explained earlier, when the filter assembly 35 and counter 37 are scanned over the spectrum of radiation emitted from the sample 30 conditions of angle with respect to the sample, and radiation intensities, are met which satisfy the terms of the Bragg equation. The difference signal varies with the difference in transmission by the filters, and the maximum difference occurs over the narrow band which includes the radiation being detected. The counter tube 37 emits electric signals in the form of pulses which are carried through a conductor 38 to a pulse amplifier 39 whereupon they are amplified and conducted to plural electronic gates 40 and 41 respectively. Gates 40, 41 are nothing more than electronic switches designed to emit successive pulses when specified conditions are met. The wave shape of the pulses produced by the respective gates is of little consequence since the gates merely actuate associated electronic triggers 42 and 43 to produce pulses for the purpose of charging a rate meter 44, as will be more fully explained subsequently. Gates 40 and 41 must operate in phase and according to the angular position of the filters 5' and 6' with which each is respectively associated. To secure this phasing, there is provided a rotating magnet 45 driven by motor 36 and a stationary armature 46 closely adjacent the magnet is provided with a coil 47 in which a varying voltage is induced in accordance with the positions of the filters. This voltage is amplified in an amplifier 48 and impressed on electronic gates 40 and 41, whereupon the respective gates are caused to switch from one to another in phase with the filter positions the pulses received from pulse amplifier 39.

Proceeding with the illustrative example, where nickel and cobalt filters are used, gate 40 may be open when the nickel filter 5' is in alignment with counter 37, whereupon a plus charge is delivered to the rate meter 44. If the target of X-ray generator 32 is copper, gate 40 actually responds to copper K-alpha radiation that passes through the sample 30 at a measureable angle.

The other gate 41, cooperating with a cobalt filter will switch to put negative charge into the rate meter 44 to cancel the charge switched by gate 40 except when the wave lengths meeting the terms of the Bragg equation nears that of copper K-alpha, whereupon the rate meter will supply an output signal, which when coordinated with the angle of diffraction, will yield information as to the identity of the diffracting crystalline material.

It is evident that the rotating disk containing filters 5' and 6' could just as well be positioned in the X-ray beam 31, from source 32 to specimen 30, without changing the principles of operation of the diffraction device embodying this invention. In fact, these filters can be placed anywhere in the X-ray beam between the source 32 and detector 37.

Although the action of a conventional rate meter is known in the electronic art, the function of one modified for the present purpose, such as 44, will be described briefly. Note that there are provided capacitors 49 and 50 for receiving current pulses from triggers 42 and 43 respectively. Capacitors 49 and 50 may be selected to have about 1/10 the capacity of capacitor 51. Capacitor 49 is biased negatively through a diode 52 and capacitor 50 is biased positively through another diode 53 in order to prevent conduction during a pulse from the other side. The bias on capacitor 49 is applied through diode 52 at voltage below ground and the bias on capacitor 50 is impressed through diode 53 at the same magnitude of voltage above ground.

During that half of the cycle that filter 5' is in the beam and gate 40 is permitted to transmit pulses from the amplifier 39 to trigger 42, capacitor 49 will charge and discharge through the diodes 52 and 54 so that positive charge is passed to capacitor 51. During the other half of the cycle that filter 6' is in the beam, by the same process diodes 53 and 55 will pass negative charge to capacitor 51. Thus, the net charge passed in a whole cycle depends on the difference in the pulse rates corresponding to the operation with the two filters. Since the transmission of the filters is approximately equal on both sides of the range selected, the charge difference will be zero. The copper K-alpha radiation which is within the range where the transmission of nickel filter 5' is much greater than that of cobalt filter 6' will then produce charges that will not cancel on capacitor 51.

The voltage developed on capacitor 51 is amplified by a D.C. amplifier 56 for instance, that is shunted with a feedback resistor 57. The output from amplifier 56 may be delivered as shown to any form of visual indicating device or automatic recording device such as 58.

Other electronic circuitry could be used to display the difference signal as a number of pulses, as for instance by a "scaler."

Although the described illustrative examples involve emission and diffraction phenomena, it will be evident that the broad principles of the invention are applicable to absorption phenomena or to any situation where it is desired to indicate the presence of various orders of radiation wave lengths in a particular spectrum or to indicate monochromatic radiation in a polychromatic beam. In any case, according to the invention, it is possible to establish the radiation wave length limits of the intensities which are to be measured by jointly using balanced filters whose absorption edges lie close to each other. Furthermore, while the illustrative examples have employed filters whose radiation transmission was approximately equal outside the range to be measured, the cancellation so effected could have been achieved at least in part by circuit adjustments to alter the electrical response to signals obtained through the different filters.

The particular embodiments of the invention described are intended to be illustrative rather than limiting, for the invention may be variously embodied and is to be interpreted according to the scope of the claims which follow.

It is claimed:

1. Apparatus for selecting radiation between particular wave length limits comprising, at least a pair of filters disposed in the path of the radiation, said filters having similar absorption characteristics over wave length bands on each side of their cutoff points which establish the limits, detector means adapted to receive radiation transmitted substantially concurrently by each filter and to develop a signal therefrom, and means for differentiating the signal developed by radiation transmitted by the different filters to produce output signals as a continuous function of the intensity difference in transmitted radiation of said filters and indicative of the radiation of wave lengths between said limits.

2. Apparatus for selecting X-radiation between particular wave length limits comprising, at least a pair of filters jointly disposed to transmit the radiation simultaneously, said filters having similar absorption characteristics over wave length bands on each side of their absorption edges which establish the limits, a radiation detector in the path of radiation transmitted through each respective filter, said detectors developing simultaneous and substantially equal signals in response to radiation wave lengths on each side of said limits and simultaneously different signals between said limits, and means for subtracting said signals from each other to produce an output signal as a continuous function of the intensity difference in transmitted radiation of said filters and indicative of the radiation of wave lengths between said limits.

3. Apparatus for selecting X-radiation between particular wave length limits comprising, a pair of adjacent filters disposed to transmit beams of the radiation, said filters having substantially coincident absorption curves over wave length ranges on each side of their respective absorption edges which establish the limits, radiation detector means associated with each filter and adapted to intercept radiation transmitted simultaneously through each filter respectively, said detectors each producing opposed electric signals corresponding with the wave lengths of radiation intercepted, and means for superimposing said signals to produce a difference signal as a continuous function of the difference in transmitted radiation of said filters and indicative of the radiation of wave lengths between said limits.

4. The invention according to claim 3 wherein said detectors are ion chambers that are directly connected with each other in opposed polarity to develop an appreciable difference signal only at radiation wave lengths between said limits.

5. Apparatus for selecting X-radiation between particular wave length limits including a source of X-rays and comprising at least a pair of jointly moveable filters alternately disposed in the path of said X-rays for transmitting the same, motor means for moving said filters, a radiation detector means adapted to intercept in substantially uninterrupted succession radiation transmitted through different filters and to produce corresponding periodic electric signals, electronic gate means controlled by said signals, means for synchronizing operation of the gate means respectively with the position of the filters, and means controlled by the gate means for developing a signal as a continuous function of the difference in radiation absorbed by said filters.

6. Apparatus for selecting X-radiation between particular wave length limits including a source of X-rays and comprising, at least a pair of jointly moveable filters alternately disposed in an X-ray beam path for transmitting the same, said filters having similar absorption characteristics over wave length ranges on each side of their absorption edges which establish the limits, a detector means for each set of filters adapted to intercept in substantially uninterrupted succession radiation transmitted through successive filters, said detector means developing successive electric signals corresponding with the radiation intercepted, means producing periodic electric signals in synchronism with the various positions of said filters, and means controlled by both said signals for producing output signals as a continuous function of the difference in transmitted radiation of said filters and indicative of the radiation of wave lengths between said limits.

7. Apparatus for selecting X-radiation between particular wave length limits including a source of X-rays and X-ray detector means, at least a pair of jointly moveable filters interposed between said source and said detector means, said filters having substantially similar absorption characteristics over a range of wave lengths aside from the wave lengths which correspond with the absorption edges that establish said limits, means for jointly moving said filters to permit said detector means to intercept in substantially uninterrupted succession radiation transmitted by successive filters, said detector means thereby developing successive electric signals corresponding with the wave lengths of the radiation intercepted, electronic gate means corresponding with the number of filters, means producing successive gate control signals in synchronism with the position of the filters and the signals from said detector means, and trigger means controlled by said gate means to produce a resultant signal representing as a continuous function the differences in radiation of wave lengths between the absorption edges of the filters.

References Cited in the file of this patent
UNITED STATES PATENTS

| | | |
|---|---|---|
| 2,642,537 | Carroll et al. | June 16, 1953 |
| 2,648,012 | Scherbatskoy | Aug. 4, 1953 |
| 2,848,624 | Friedman et al. | Aug. 19, 1958 |
| 2,853,618 | Marco et al. | Sept. 23, 1958 |
| 2,874,297 | Sparks | Feb. 17, 1959 |
| 2,881,327 | Hendee et al. | Apr. 7, 1959 |
| 2,926,257 | Friedman | Feb. 23, 1960 |

OTHER REFERENCES

Photon Counters for Far Ultraviolet, by Chubb et al., The Review of Scientific Instruments, vol. 26, No. 5, May 1955, pages 493 to 498.

Elements of X-ray Diffraction," by Cullity, Addison-Wesley Publishing Company, Inc., Reading Mass., 1956, pages 211 to 213.